(12) United States Patent
Maertens et al.

(10) Patent No.: US 7,308,326 B2
(45) Date of Patent: Dec. 11, 2007

(54) METHODS OF OPTIMIZING STOCHASTIC PROCESSING PARAMETERS IN CROP HARVESTING MACHINES

(75) Inventors: Koen Maertens, Koksijde (BE); Josse G. De Baerdemaeker, Merchtem (BE)

(73) Assignee: CNH America LLC, New Holland, PA (US)

( * ) Notice: Subject to any disclaimer, the term of this patent is extended or adjusted under 35 U.S.C. 154(b) by 300 days.

(21) Appl. No.: 10/520,318

(22) PCT Filed: Jul. 25, 2003

(86) PCT No.: PCT/EP03/08272

§ 371 (c)(1),
(2), (4) Date: Jan. 4, 2005

(87) PCT Pub. No.: WO2004/012494

PCT Pub. Date: Feb. 12, 2004

(65) Prior Publication Data

US 2005/0241285 A1 Nov. 3, 2005

(30) Foreign Application Priority Data

Jul. 26, 2002 (GB) .................................. 0217297.1

(51) Int. Cl.
*G05B 13/02* (2006.01)
*G06F 19/00* (2006.01)

(52) U.S. Cl. .......................... 700/95; 700/28; 700/30; 700/31; 700/32; 701/50; 702/5; 56/10.2 A; 56/10.2 C (58) Field of Classification Search ............ 700/28–32, 700/90, 95; 701/50, 200, 207, 208; 702/5, 702/182; 56/10.2 A–10.2 D, 10.2 G, 10.2 J
See application file for complete search history.

(56) References Cited

U.S. PATENT DOCUMENTS 5,995,895 A 11/1999 Watt et al.
6,061,618 A 5/2000 Hale et al.

FOREIGN PATENT DOCUMENTS

| EP | 0339141 A1 | 11/1989 |
| EP | 0463240 | 1/1992 |
| GB | 0217297.1 | 2/2004 |
| WO | WO 02/41687 A2 | 5/2002 |
| WO | WO 2004/012494 A1 | 2/2004 |

*Primary Examiner*—Leo Picard
*Assistant Examiner*—Sean Shechtman
(74) *Attorney, Agent, or Firm*—Michael G. Harms; John William Stader; Patrick M. Sheldrake (57) ABSTRACT

A precision farming method including a stochastic parameter $\vartheta$, which is continuously optimized to adjust the model to the latest prevailing working conditions. Such parameter may be considered to constitute a variable which characterizes the instantaneously prevailing readiness of the harvesting process. Such variable $\vartheta$ can be used for establishing field maps showing the evolution of the harvesting operation itself. It can also be used in automatic routines which adjust the harvester speed in order to limit the grain losses.

6 Claims, 4 Drawing Sheets

METHODS OF OPTIMIZING STOCHASTIC PROCESSING PARAMETERS IN CROP HARVESTING MACHINES

CROSS-REFERENCE TO RELATED PATENT APPLICATIONS

This Patent Application claims priority under 35 U.S.C. 371 to PCT International Application Number PCT/EP03/08272, which was filed on Jul. 25, 2003, and which has Convention Priority based on Great Britain Application GB 0217297.1, filed Jul. 26, 2002.

FIELD OF THE INVENTION

This invention relates to methods for establishing parameters for modelling the behaviour of crop harvesting machines such as but not limited to combine harvesters. In particular it relates to a method for optimizing stochastic model parameters in models for a crop processing operation in such harvesting machines. The method is particularly useful in the context of "precision farming" techniques, in which combine harvesters and other harvesting machines have played a significant role, as well for the development as for the application of these techniques.

BACKGROUND OF THE INVENTION

"Precision farming" is a broad term that embraces practices such as:

field yield mapping aimed at accurately mapping the crop-producing productivity of a field so that:
  seeds and agro-chemicals can be economically and correctly applied without over- and under-dosing the plants;
  harvesting and other agricultural machinery can be adjusted to take account of varying crop conditions from place to place in a field;
modelling, of process conditions, within agricultural machines, and developing control philosophies aimed at:
  improving machine efficiency or workrate;
  reducing fuel consumption; and
  improving the quality of work carried out by agricultural machines; and
providing alerts and reports of abnormal conditions in crops.

Sometimes the overall improvement in farming efficiency resulting from an individual precision farming practice might be only a few percent; but cumulatively such efforts have dramatically improved productivity in mechanised farming over recent years.

The significance of harvesters, such as combine harvesters, to precision farming derives principally from the following factors:

(i) A harvester is able to assess the output of a farming operation for example in terms of crop yield. A field map of such data is invaluable in improving farming efficiency in future crop growing and harvesting seasons; and (ii) Harvesters are complicated machines that provide numerous sites for the location of transducers whose function is to gather data on the harvesting processes and the crops passing through the machine.

As noted, the combine harvester has been particularly useful in producing maps indicating the expected crop yield at different locations in a field. Farmers can use such maps (that are readily stored in digital form in a computer memory) to control in an accurate way the processes forming part of a crop growing season, so that the yield of the field is maximized.

Prior art techniques for yield mapping, however, are limited primarily because they concentrate on the quantity of the useable part of the crop that is conveyed to e.g. the clean grain tank in a combine harvester.

Although measurements of e.g. the mass flowrate of clean grain to the clean grain tank may readily be compensated for some variables such as grain moisture content and grain type, some difficulties remain.

Significant among these is the fact that mass flowrate measurements of crop yield generally take no account of crop losses arising from e.g. incomplete or faulty threshing of ears in the threshing drum or another part of the harvester where grain separation occurs. Where the machine load exceeds the threshing, separation and/or cleaning capacity of the machine a portion of the harvested grain will not be separated from the straw and chaff and be deposited therewith on the field behind the machine.

It is known, for example, that the extent to which (or the ease with which) ears are threshed in the threshing drum of a combine harvester is strongly dependent on the feedrate of crop into the harvesting machine, when such factors as grain and straw moisture, crop variety and straw length are kept as constants. Thus for higher feedrates relatively less grain is separated in the first concave threshing drum section than in the case of low feedrates. More grain has to be separated in the further stages of the harvester.

Consequently for such high feedrates a lesser proportion of the crop is therefore likely to reach the clean grain tank, with the result that a yield measurement taken at such a location may be inaccurate. Furthermore such a measurement takes no account of the extent to which grains become damaged or lost within the combine harvester.

In reality a great number of variables influences the extent to which the threshing and separating sections are able to separate grain from other plant matter such as chaff and straw. Such variables include, but are not limited to:

the nature of the soil in which the crop grows;
settings of various adjustable components of the harvesting machine, e.g. the height of the header bar in a combine harvester, which directly influences the straw to grain ratio;
the slope of the field in which the machine operates;
the moisture content of the crop;
the crop type;
the forward speed of the harvesting machine;
the presence of weed patches;
the state (wear) of the machine elements;
the type of installed machine elements, e.g. the type of rasp bars; and so on.

According to a first aspect of the invention there is provided a method of substantially continuously optimizing a stochastic parameter $\vartheta$ that characterizes the instantaneously prevailing readiness with which crop is processed in a harvesting machine, including the step of recursively calculating the optimized parameter value in accordance with the following algorithm:

$$\hat{\vartheta}(t) = f(\hat{\vartheta}(t-1), \epsilon(t, \hat{\vartheta}(t-1))) \tag{A}$$

wherein:

$\hat{\vartheta}(t)$ is the optimized stochastic parameter value at time t; and $\epsilon(t, \hat{\vartheta}(t))$ is an error prediction function.

Such a method is highly suited to the continuous optimization of the highly stochastic parameter $\vartheta$ that, when applied to the threshing and separation process a combine harvester, may fairly be termed a "threshability" parameter, i.e. an indication of the extent to which the harvesting machine is capable of threshing the crop at time t.

Such a parameter is useable in various ways, as discussed hereinbelow.

The algorithm generally may take the form of:

$$\vartheta(t)=f(\vartheta(t-1), \ldots, \vartheta(t-n\vartheta),\epsilon(t), \ldots, \epsilon(t-n_\epsilon),t).$$

The method of the broad aspect of the invention can readily be carried out using a suitably programmed computer carried by or forming part of the harvesting machine.

Preferably the algorithm (A) has the form:

$$\hat{\vartheta}(t)=\hat{\vartheta}(t-1)+\gamma(t)r^{-1}(t)\psi(t,\hat{\vartheta}(t-1))\epsilon(t,\hat{\vartheta}(t-1))$$

wherein $\gamma(t)$ is a gain term;

$r(t)$ is a scalar approximation of a Hessian V" ($\vartheta$) in which V is indicative which V is a quadratic error criterion;

$$\psi(t,\vartheta) = \frac{d\hat{y}(t,\vartheta)}{d\vartheta},$$

in which $\hat{y}(t,\vartheta)$ is an estimation of a value indicative of the effectiveness of said crop processing in said harvesting machine said estimation being based on stochastic parameter $\vartheta$; and $\epsilon(t,\hat{\vartheta}(t-1))$ is the difference between the actual effectiveness value y(t) and the estimated value $\hat{y}(t,\vartheta)$ based on the previously optimized parameter $\hat{\vartheta}(t-1)$.

Preferably the algorithm (A) includes an estimation of r(t) that is weighted to reduce the influence, on the optimized parameter values $\hat{\vartheta}$, of past measurements.

This aspect of the method renders the parameter optimization more realistic and robust for a wide range of working conditions.

The parameter $\vartheta$ may be usable in a model for the relation between a value u(t) indicative of the feedrate of crop into the harvesting machine and a value y(t) indicative of the effectiveness of an operation processing said crop in said harvesting machine. The estimated value $\hat{y}(t,\vartheta)$ is then an estimation of the effectiveness obtained by the application of said model to the feedrate values u(t).

In this manner the model can be updated continuously in order to meet any changes to the process caused by a wide range of changing conditions, e.g. varying crop properties such as ripeness or moisture or changes in inclination of the machine.

Advantageously, the model may comprise an exponential function.

Such form provides some computational advantages for the optimization of $\vartheta$.

The effectiveness may take the form of a value indicative of crop flow, e.g. crop losses at the end of the separation or the cleaning section. It may also comprise the crop flow in a return system.

According to a second aspect of the invention there is provided a method of operating a harvesting machine comprising the steps of:

substantially continuously optimizing a stochastic parameter that characterizes the instantaneously prevailing readiness with which the harvesting machine processes crop; and substantially continuously adjusting a performance variable of the harvesting machine in dependence on the instantaneous, optimized value of said parameter in order to optimize the load of the harvesting machine so as to keep a value indicative of the effectiveness of said harvesting machine below a predetermined value.

Such effectiveness value may comprise the losses of useable crop parts such as separation or cleaning sieve losses, or a proportion of damaged useable crop parts, e.g. broken grain kernels, or a proportion of unwanted material in the useable crop parts, e.g. chaff and straw and particles in the clean grain.

Optimizing the machine load may comprise optimizing the feedrate of crop into the harvesting machine, e.g. by adapting the travel speed of the harvesting machine.

Conveniently the step of adjusting a performance variable of the harvesting machine occurs in dependence on the output of an inverted form of an effectiveness estimation function:

$$\hat{y}(t,\vartheta)=\exp(\vartheta u(t))-1. \tag{B}$$

Herein u(t) may be the measured feedrate and $\hat{y}(t,\vartheta)$ the grain losses.

According to a third aspect of the invention there is provided a method of mapping one or more field lots for variations in a stochastic parameter that characterizes the instantaneously prevailing readiness with which a harvesting machine processes crop, the method comprising the steps of:

operating a harvesting machine to harvest crop in a said field lot;

simultaneously measuring the machine load and the machine effectiveness and determining the position of the machine in the field lot;

storing data indicative of the position of the harvesting machine at time t;

using the measured machine load and machine effectiveness data in an optimization of said parameter; and mapping the optimized parameter values obtained from the using the measured machine load and machine effectiveness data step so as to produce a parameter map of the field lot.

According to a fourth aspect of the invention there is provided a method of operating a harvesting machine comprising the steps of:

substantially continuously optimizing a stochastic parameter that characterizes the instantaneously prevailing readiness with which the harvesting machine separates useable crop parts from other plant matter; and sending a display signal, that is indicative of the instantaneous parameter value, to a display device.

Preferably the display signal indicates an abnormal parameter value.

Preferably in each of the second, third and fourth aspects of the invention the optimization step is in accordance with the first aspect of the invention. Thus the method of the first aspect of the invention is highly versatile in its application.

Conveniently in each of the $2^{nd}$ to $4^{th}$ aspects of the invention, when the parameter optimization is according to the first aspect of the invention, said selected part of the harvesting machine is selected from:

the separation section, e.g. the straw walkers or a rotary separator;

the sieve;

the return flow system;

the cleaning section; or the grain elevator;

of a combine harvester.

BRIEF DESCRIPTION OF THE DRAWINGS

The invention will now be described in more detail, by way of non-limiting example. In the following description reference is made to the accompanying drawing figures in which.

DETAILED DESCRIPTION OF THE PREFERRED EMBODIMENTS

The terms "grain", "straw", and "tailings" are used principally throughout this specification for convenience and it should be understood that these terms are not intended to be limiting. Thus "grain" refers to that part of the crop which is threshed and separated from the discardable part of the crop material which is referred to as "straw". Incompletely threshed ears are referred to as "tailings". Also, the terms "forward", "rearward", "upper", "lower", "left", "right", etc. when used in connection with the combine harvester and/or components thereof, are determined with reference to the combine harvester in its normal operational condition and may refer either to the direction of forward operative travel of the combine harvester or to the direction of normal material flow through components thereof. These terms should not be construed as limiting.

Figure 1:
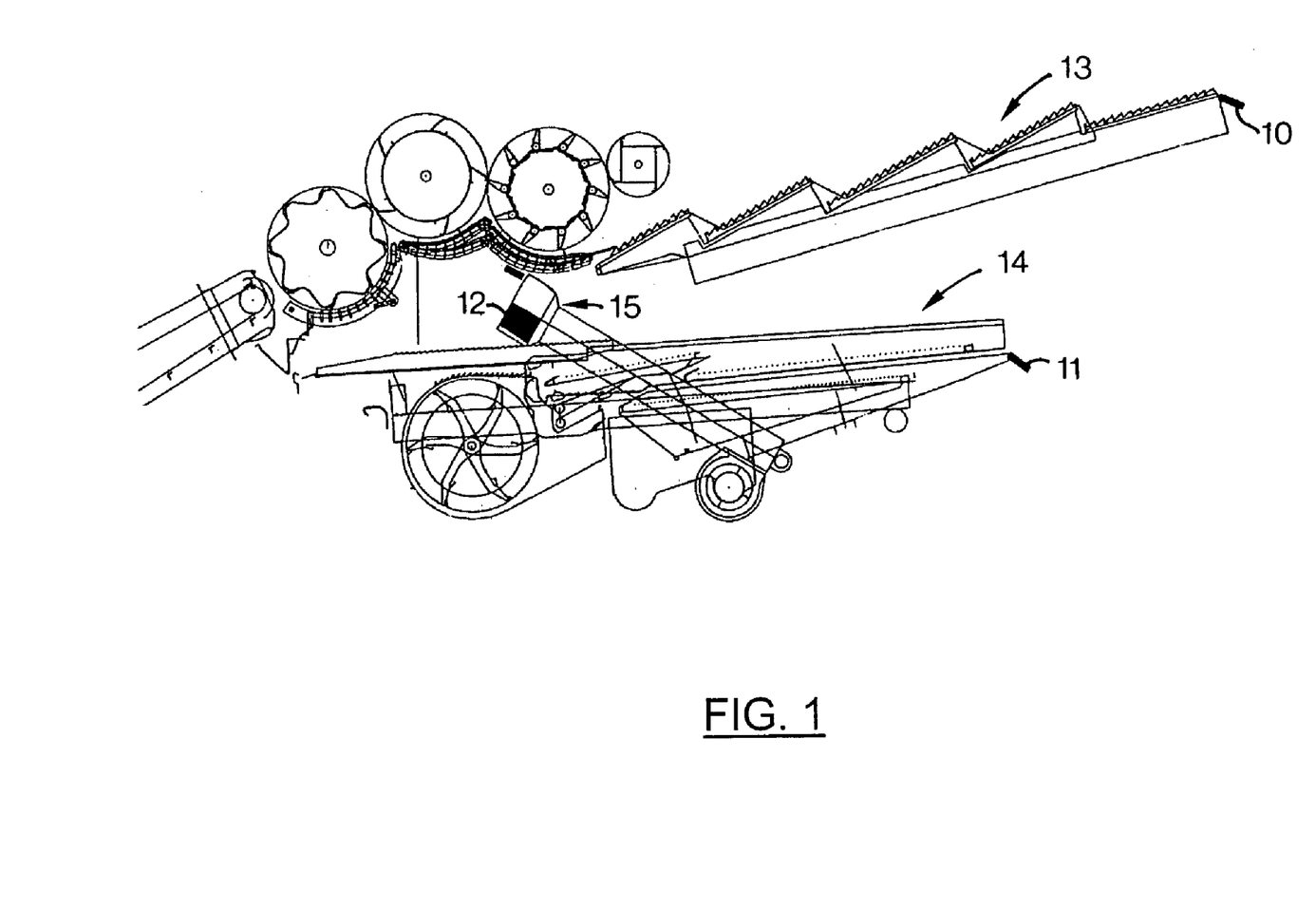
FIG. 1 is a schematic representation of the threshing, cleaning and straw walker sections of a combine harvester showing the possible locations for grain loss transducing devices.

FIG. 1 shows the position of respective crop flow or loss sensors 10, 11, 12 in the separation 13, cleaning 1) and return flow 15 sections of a typical combine harvester. The illustrated separation section comprises a set of straw walkers 13, but the invention may also be used with harvesters comprising a rotary separator.

Any of the positions 10, 11, 12 may readily be used within the scope of the invention as locations for grain loss sensors. The following notes apply to the respective sensors:

Sensor 10:

Separation losses are generally measured by means of impact detectors. Impacts of kernels are separated from impacts of straw ends and counted each second. By this, a measure is found for the amount of separation losses. Since the distribution of free grain kernels along the depth of the straw layer varies in time, only a rough indication is normally obtained.

Sensor 11:

One similar impact sensor may be installed at the end of the cleaning section. Again only a rough measure is normally found for the sieve losses.

Sensor 12:

Tailings fall behind the lower sieve into the cross auger of the return flow system. An impeller is installed at the end of the fast rotating auger to spread the return flow. The sensor preferably operates measuring the phase shift between a fixed impeller and a flexible one as described in EP-A-0 463 240. Higher material flows imply larger phase shifts.

In addition, the harvester preferably is equipped with precision farming tools to measure the actual cutting width, ground speed, mass flow, feedrate and position within the field.

The outputs of such sensors may be employed in a technique, involving the use of an offline model for the crop processing operation. Establishing such model involves the determination of one or more parameters, e.g. a threshability parameter $\vartheta$.

The exponential function offers good opportunities to make a prediction of actual separation losses (T/h) based on an online measurement of feedrate u(t) (T/h), wherein (T/h) is representative of tons per hour. The feedrate may be measured at the inlet of the harvester, e.g. by monitoring the volume of crop material entering the straw elevator, or by measuring the force or torque needed to convey the crop mass into the machine.

Advantageously, the exponential function may take the form of:

$$\hat{y}(t,\vartheta) = \exp(\vartheta u(t)) - 1. \tag{1}$$

Equation (1) illustrates that no separation losses occurs for a zero feedrate and the feedrate-loss relation is fully determined by parameter $\vartheta$. The time delay between the feedrate signal u(t) and y(t) is assumed to be fixed and an optimal fixed time shift (typically 11 s) is installed as a compensation. For online measurements, separation losses and feedrate will be expressed in respectively impacts per second (#/s) and Volt (V). To optimize the parameter $\vartheta$, following quadratic criterion V($\vartheta$) is proposed in function of prediction error $\epsilon(t,\vartheta)$ (#/s):

$$V(\vartheta) = E\{0.5\epsilon^2(t,\vartheta)\} \quad \epsilon(t,\vartheta) = y(t) - \hat{y}(t,\vartheta). \tag{2}$$

Wherein, V is a the quadratic error criterion, selected by the Applicants as a value for the precision of $\vartheta$.

E{.} is the expected value function. After an estimation or a calculation of $\vartheta$, the actual variables y(t) are compared to the calculated variables $\hat{y}(t,\vartheta)$ and the difference $\epsilon$ is squared over the measurement range of t.

So, for continous functions over the interval $(t_e, t_o)$, E{.} may be set equal to:

$$V(\vartheta) = \frac{1}{t_e - t_o} \int_{i=t_o}^{t_o} 0.5\varepsilon^2(t, \vartheta) dt$$

For discontinous functions involving N discrete points, E{.} may be set equal to $$V(\vartheta) = \frac{1}{N} \sum_{k=1}^{N} 0.5\varepsilon^2(k, \vartheta)$$

In case an optimal solution has to be found after N discrete input and output measurements $(u_k, y_k)$ are carried out, V($\Theta$) can be approximated by $V_N(\vartheta)$:

$$V_N(\vartheta) = \frac{1}{N} \sum_{k=1}^{N} 0.5\varepsilon^2(k, \vartheta). \tag{3}$$

Figure 2:
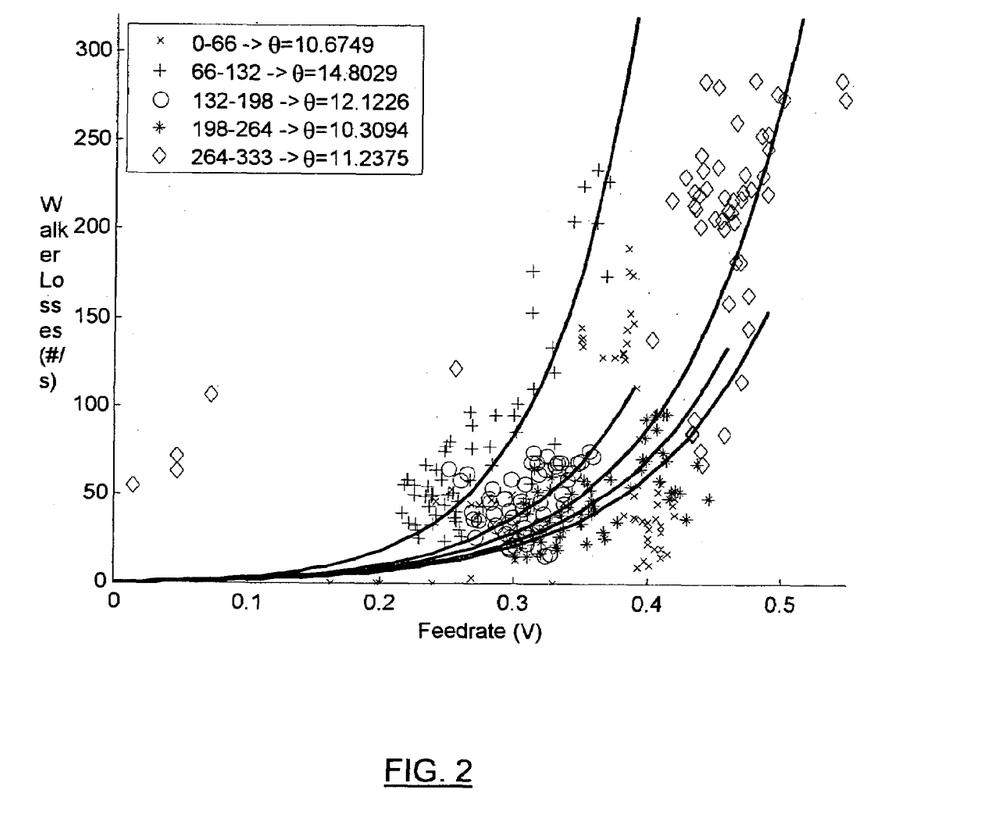
FIG. 2 is a graphical representation of the highly stochastic nature of a processability, in particular threshability parameter $\vartheta$, by reference to field slope (gradient) values.

For each set of N measurements it is possible to find an optimal parameter $\vartheta$ wherefor the quadratic criterion V($\vartheta$) is minimised. FIG. 2 gives the optimized exponential relation for five sections in one 330 m harvest strip with a large variance in threshability due to different nitrogen applications and slope (α) fluctuations. In the first and last section, some erratic data points are lying near to the X and Y-axis respectively because of the dynamic step responses when the harvester enters and leaves the crop.

Recursive Estimation of Grain Loss Curves

As can be seen in FIG. 2, a large variance in the model parameter can be detected in one single crop strip. Therefore, it is preferable to have an online optimal estimation (in accordance with the invention) of the local separation behaviour. This site-specific information offers new possibilities for automatic tuning systems in a more direct way compared to the prior art online yield mapping systems, since it immediately relates feedrate u(t) with straw walker losses y(t) and provides an extra crop parameter $\vartheta$ that may play an important role in the evaluation of new crop varieties.

Herein an online optimization procedure is derived based on a stochastic gradient method. The stochastic gradient method can be seen as a stochastic analog of the method of steepest descent for the minimisation of a deterministic function. In its general form, this method of steepest descent is represented by:

$$x^{(t+1)} = x^{(t)} - \gamma^{(t)} \left[ \frac{d}{dx} V(x) \right]^T \bigg|_{x=x^{(t)}} \quad (4)$$

where $x^{(t)}$ denotes the t th iterate and $\gamma^{(t)}$ a chosen positive scalar. This approach may show useful, however, when the iterates are getting close to the minimum, this method is known to be fairly inefficient.

The so-called quasi-Newton methods yield distinctly better results and use a modified search direction from the negative gradient direction:

$$x^{(t+1)} = x^{(t)} - \gamma^{(t)} \left[ \frac{d^2}{dx^2} V(x) \right]^{-1} \left[ \frac{d}{dx} V(x) \right]^T \bigg|_{x=x^{(t)}} \quad (5)$$

This iteration will provide convergence in one step to the minimum of V(x), if this function is quadratic in x and $\gamma^{(t)} \equiv 0.5$.

When applied to the present optimization problem, the quasi-Newton optimization scheme can be transformed into following gradient scheme, which could be called a "stochastic Newton algorithm":

$$V(\vartheta) = EH(\vartheta, e(t)) \quad (6)$$

$$\hat\vartheta(t) = \hat\vartheta(t-1) + \gamma(t)[\overline{V}''(\hat\vartheta(t-1), e^t)]^{-1} Q(\hat\vartheta(t-1), e^t) \quad (7)$$

where $\overline{V}''(.)$ denotes the approximate Hessian, $-Q(.)$ is the gradient of H(x,e) with respect to x and $e^t$ indicates that the approximation depends on previous noise values $e^t = e(t)$, $e(t-1), \ldots$ When this scheme is applied to the problem definition of equation (1) and (2), following algorithm is obtained for the model parameter $\vartheta(t)$:

$$\hat\vartheta(t) = \hat\vartheta(t-1) + \gamma(t) r^{-1}(t) \psi(t, \hat\vartheta(t-1)) \epsilon(t, \hat\vartheta(t-1)) \quad (8)$$

where $$\psi(t, \vartheta) = \frac{d\hat y(t, \vartheta)}{d\vartheta}$$

and scalar r(t) corresponds with the instantaneous estimation of Hessian $V''(\vartheta)$. When an exponential process model according to function (1) has been chosen, $\psi(t, \vartheta)$ will be equal to $\exp(\vartheta.u(t)).u(t)$.

$\hat\vartheta(t-1)$ is the estimated/optimised value for $\vartheta$, as based on the data available at the time (t-1). A new estimate/optimisation $\hat\vartheta(t)$ for $\vartheta$ can be made at the next time t and its value will be calculated from a function involving the previously estimated available value $\hat\vartheta(t-1)$ and the error $\epsilon(t)$ between the actual values y available (including the new one at time t) and the calculated values for the same interval, using the previous estimate $\hat\vartheta(t-1)$. $\epsilon(t, \hat\vartheta(t-1)) = y(t) - \hat y(t, \hat\vartheta(t-1))$.

The accuracy of this approximation of the true Hessian plays a particularly important part when the recursive algorithm is operating close to the minimum. The natural approximation of this Hessian is to introduce the sample mean value:

$$\frac{d^2}{d\vartheta^2} V(\vartheta) \triangleq E\{\psi^2(t, \vartheta)\} \approx \frac{1}{t} \sum_{k=1}^{t} \psi^2(t, \hat\vartheta(t-1)) \triangleq r(t) \quad (9)$$

However, the estimation of r(t) in equation (9) puts as much attention on measurements temporally far from t as on more recent measurements. Therefore, a weighted estimation of r(t) usually yields better results:

$$r(t) = \sum_{k=1}^{t} \beta(t, k) \psi^2(k, \hat\vartheta(k-1)) + \delta(t) r_0 \quad (10)$$

where $r_0$ denotes the initial estimation of the Hessian function and weighting coefficients $\beta(t,k)$ and $\delta(t)$ should be chosen such that $$\sum_{k=1}^{t} \beta(t, k) + \delta(t) \equiv 1 \; \forall t. \quad (11)$$

A standard way to define the weighting coefficients is given by $$\gamma(t) = \gamma_0 \quad (12)$$

$$\delta(t) \equiv \prod_{k=1}^{t} [1 - \gamma_0]$$

$$\beta(t, k) \equiv \prod_{j=k+1}^{t} [1 - \gamma_0].$$

It is easy to verify that this choice of parameters fulfils condition (11). Constant gain parameter $\gamma_0$ corresponds to an exponential forgetting factor $\lambda_0 \equiv 1 - \gamma_0$.

A preferred but non-limiting practical realisation of this stochastic Newton algorithm is shown hereinafter:

r(0)=$r_o$;

θ(0)=$θ_o$;

k=1;

while (k<N);

ψ(k)=u(k)*exp[u(k)*θ(k-1)];

$\epsilon(k)=y(k)-\exp[u(k)*\theta(k-1)]+1;$ $r(k)=r(k-1)+\gamma_o*[\psi^2(k)-r(k-1)];$ $\theta(k)=\theta(k-1)+\gamma_o*\psi(k)*\epsilon(k)/r(k);$ k++;

end;

The algorithm is computationally cheap and can easily be implemented in machine software. Three parameters have to be determined before starting the algorithm. The preferred but non-limiting default values that are used in this study are added between brackets.

1. Gain sequence $\gamma(k)$ is set at a constant value $\gamma_0$ (0.2). This parameter immediately determines the tracking capabilities of the algorithm but has also an important influence on the variance on the estimation of parameter $\vartheta(k)$. A high constant gain brings about fast tracking dynamics to follow fluctuations of $\vartheta(k)$, but introduces large fluctuations around the true $\vartheta(k)$, even when the true parameter does not vary in time. It depends on the application purposes and sample frequency whether a high or low gain should be chosen.
2. The initial estimation $r_0$ (500) of the Hessian function determines the confidence of having an accurate initial estimation of $\vartheta(k)$ A high value of $r_0$ implies a long term effect of the initial estimation $\vartheta_0$ on the following parameter estimations.
3. Different strategies can be introduced to choose the initial parameter estimation $\vartheta_0$ (8). The last parameter value of a previous harvest run can be used or a parameter estimation of a near by crop strip when the tracking algorithm is connected to a positioning system.

Results and Discussion

The algorithm that has been developed in the previous section can be used to track the relation between all combinations of process (e.g. separation) and feedrate sensors. Hereabove, the relation between feedrate and straw walker losses has been studied in more detail, since it may be used in automatic tuning systems that control the straw walker losses by adapting the feedrate. When the static non-linear characteristic between both signals can be tracked online, a ground speed control system can be realised that keeps the straw walker losses at a predefined level. When such knowledge about the instantaneous separation behaviour would not be available, more conservative controllers have to be designed, resulting in lower control performances.

Figure 3:
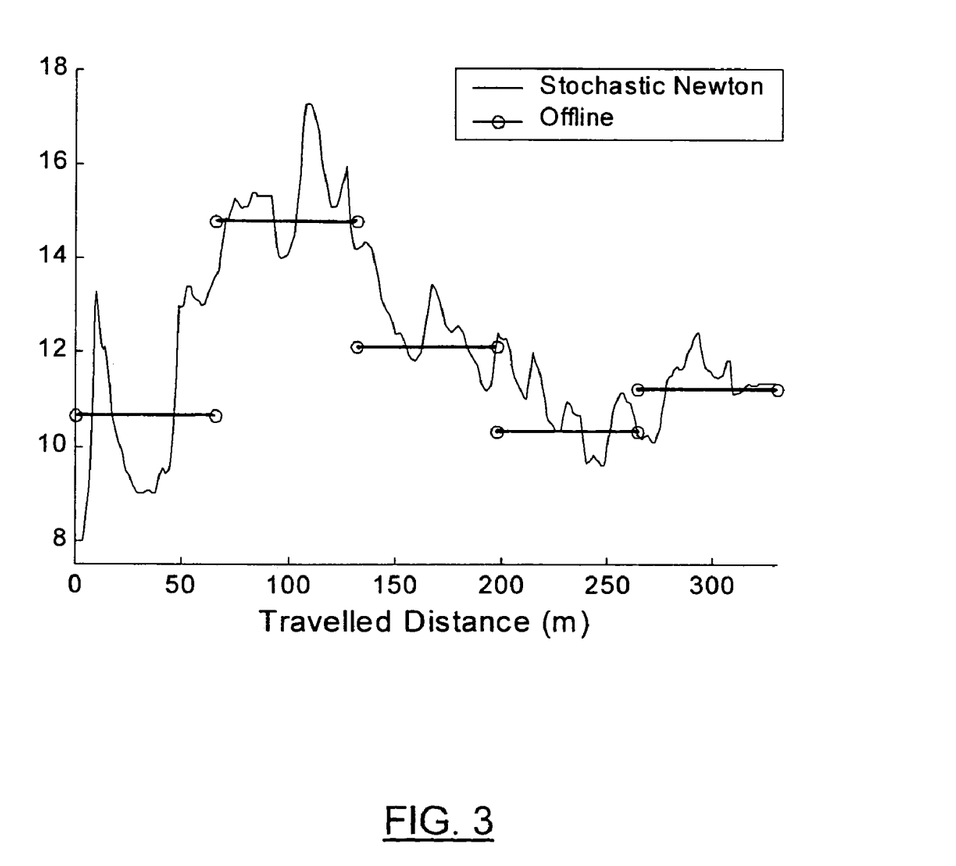
FIG. 3 shows a graphical form the variability of the optimized parameter value from place to place in a field undergoing harvesting. The FIG. 3 graph also includes, for comparison purposes, plots of parameter values calculated offline using a Least Squares technique also used to generate the plots of FIG. 2.

In FIG. 2, the signals of one 330 m harvest strip were divided into five distinct sections of about 66 m each. For each section, an optimal exponential parameter $\vartheta$ is calculated based on offline optimization techniques. FIG. 3 shows the results of the recursive algorithm for the same harvest strip. The results of the previously described offline optimization procedure are also shown to illustrate the performance of the tracking algorithm. Roughly the same parameters are obtained, but now in an online, recursive way. The zone between 50 and 150 m corresponds to data from an uphill section (+15%). Harvesting uphill reduces the separation capacity of conventional harvesters and as a result, larger coefficients $\vartheta$ are obtained. Similar results are found for zones with smaller grain/straw ratios or higher moisture contents.

Site-Specific Interpretation of Estimated Parameter Sequence

Figure 4:
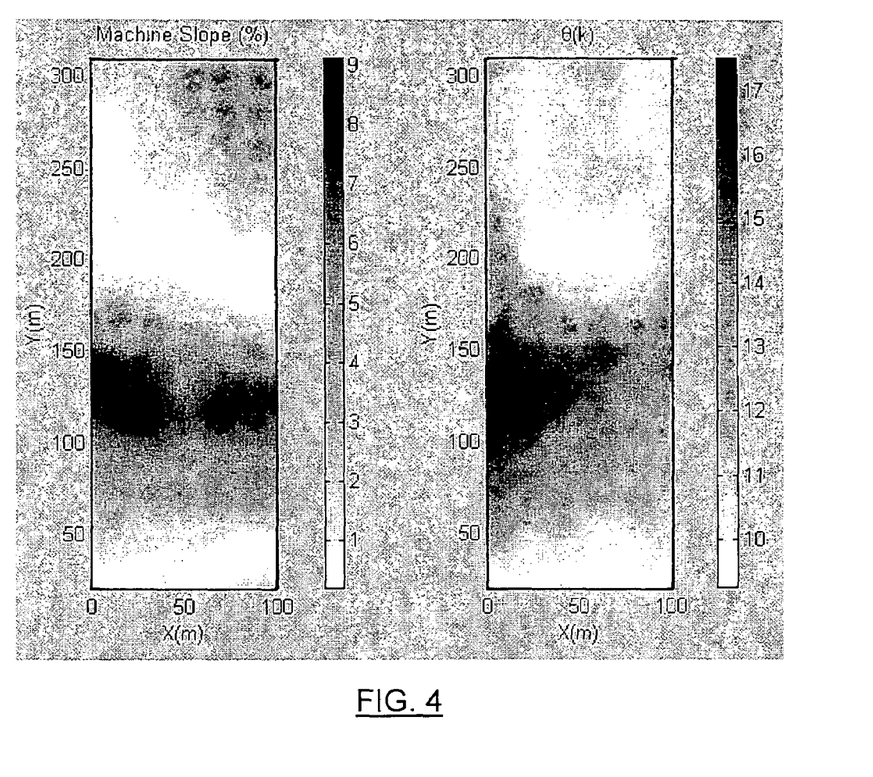
FIG. 4 is a comparison between a parameter value map and the slope of the field to which it relates.

In case variations of parameter $\vartheta$ depend on local field conditions, the same trend should be visible in adjacent strips. FIG. 4 shows this type of parameter map for a set of 7 runs that are harvested uphill, parallel to the Y-axis. The correlation with the field slope or machine slope is evident, illustrating the value of this type of parametric maps for on-line tuning of harvesters, before variations in local processability are actually registered. This field was fertilised with different doses of Nitrogen in strips parallel to the Y-axis. Therefore, the harvester reacts in a slightly different way according to the Nitrogen gift and by this, to its position on the X-axis. A field with a constant Nitrogen application would give an even better correlation of the parameter and slope map.

Although in the foregoing discussion the relationship between feedrate u(t) and straw walker losses y(t) is described, the method of the invention could equally well be used for optimizing parameters $\vartheta$ in models for other crop handling processes at any of the following sections of a combine harvester:

the separation section, e.g. the straw walker or the separator rotor;
the sieves;
the return flow system; or
the cleaning section;

or indeed in sections of other kinds of harvester.

A processability parameter can also be used for predicting the behaviour of the harvesting machine with respect to other effectiveness values such as the proportion of damaged useable crop parts, e.g. broken grain kernels, or a proportion of unwanted material in the useable crop parts, e.g. chaff and straw and particles in the clean grain.

The ability of the method of the invention to optimize the parameter $\vartheta$ in an online way offers numerous potential advantages, such as:

the ability to devise a reliable vehicle control system that controls a performance variable of the harvesting machine and that relies on a feedrate set point calculated by an inverted form of Equation (1);

the ability to devise processability-based expert systems, e.g. diagnostic systems that are self-executing in a combine harvester; warning systems manifested as feedrate or parameter "out of range" values; or information systems such as gradient-related data about likely crop losses.

A further advantage of the methods of the invention is that the processability parameter $\vartheta$ can if desired be assessed largely independently of the various sensing subsystems of a harvesting machine equipped for precision farming. In other words the optimized threshability parameter $\vartheta$ implicitly takes account of the crop, vehicle and field conditions that give rise to a particular value of $\vartheta$, without necessarily having to evaluate each individual cause.

The method described in full detail above can be used for optimizing a single parameter used in a model for crop processing. However, it is readily conceivable that analogous methods can be used for optimizing two or more stochastic parameters where such plurality of parameters is used for modelling an operation in a harvesting machine. Each parameter by itself, or each combination of parameters, can constitute a characteristic of the readiness with which the crop is processed.

The invention claimed is:

1. A method of operating a harvesting machine comprising the steps of:

continuously optimizing a stochastic parameter that characterizes the instantaneously prevailing readiness with which the harvesting machine processes crop; and continuously adjusting a performance variable of the harvesting machine in dependence on the instantaneous, optimized value of said parameter, in order to optimize a load of the harvesting machine so as to keep a value y(r) indicative of the effectiveness of said harvesting machine below a predetermined value, wherein the step of adjusting a performance variable of the harvesting machine occurs in dependence on the output of an inverted form of a yield loss estimation function:

$$\hat{y}(t,\vartheta)=\exp(\vartheta u(t))-1$$

wherein:

$\hat{y}(t,\vartheta)$ is the estimated yield loss;
t is for time;
$\vartheta$ is a stochastic parameter;
u(t) is the feedrate of crop; and
exp is an exponential function.

2. A method according to claim 1, wherein:

processing the crop comprises separating useable crop parts from other plant matter;

optimizing the load of the harvesting machine comprises optimizing the feedrate u(t) of crop into the harvesting machine; and the effectiveness value comprises losses y(t) of useable crop parts.

3. A method according to claim 1, wherein the step of continuously optimizing a stochastic parameter includes the step of recursively calculating the optimized parameter value in accordance with the following algorithm:

$$\hat{\vartheta}(t)=f(\hat{\vartheta}(t-1),\epsilon(t,\hat{\vartheta}(t-1))) \qquad (A)$$

wherein:

$\hat{\vartheta}(t)$ is the optimized stochastic parameter value at time t; and $\epsilon(t,\hat{\vartheta}(t))$ is an error prediction function.

4. A method according to claim 1, wherein adjusting a performance variable comprises adjusting a travel speed of said harvesting machine or an actual cutting width of a header of said harvesting machine.

5. A method of mapping one or more field lots for variations in a stochastic parameter that characterizes the instantaneously prevailing readiness with which crop is processed in a harvesting machine, the method comprising the steps of:

operating a harvesting machine to harvest crop in a field lot;

simultaneously measuring a machine load and the machine effectiveness and determining the position of the machine in the field lot;

storing data indicative of the position of the harvesting machine at time t;

using the measured machine load data u(t), and machine effectiveness data y(t) in an optimization of said parameter; and mapping optimized parameter values obtained from the step of using the measured machine load data u(t) and machine effectiveness data y(t) in an optimization of said parameter; so as to produce a parameter map of the field lot.

6. A method according to claim 5, wherein the step of using the measured machine load data u(t), and machine effectiveness data y(t) in an optimization of said parameter includes the step of recursively calculating the optimized parameter value in accordance with the following algorithm:

$$\hat{\vartheta}(t)=f(\hat{\vartheta}(t-1),\epsilon(t,\hat{\vartheta}(t-1))) \qquad (A)$$

wherein:

$\hat{\vartheta}(t)$ is the optimized stochastic parameter value at time t; and $\epsilon(t,\hat{\vartheta}(t))$ is an error prediction function.

* * * * *